May 15, 1951     J. G. PETERLIN     2,553,379
FERTILIZER SPRAY DEVICE

Filed Jan. 10, 1949     2 Sheets-Sheet 1

Inventor
JOHN G. PETERLIN
By Homer G. Sweet
Attorney

May 15, 1951  J. G. PETERLIN  2,553,379
FERTILIZER SPRAY DEVICE
Filed Jan. 10, 1949  2 Sheets-Sheet 2

Inventor
JOHN G. PETERLIN
By *Howard S. Sweet*
Attorney

Patented May 15, 1951

2,553,379

UNITED STATES PATENT OFFICE 2,553,379

FERTILIZER SPRAY DEVICE

John G. Peterlin, Pueblo, Colo.

Application January 10, 1949, Serial No. 70,060

3 Claims. (Cl. 299—84)

This invention relates to apparatus and devices for the supply of food, chemicals, insecticides, and analogous materials, to soil areas as an incident of area irrigation, and more particularly to such apparatus and devices in form adapted for use on lawns, small gardens, and the like, in association with conventional hose-type irrigating facilities, and has as an object to provide an improved, compact, readily-portable unit connectible with ordinary hose-type conduits to spray a water solution of desired additives over and upon selected soil areas.

A further object of the invention is to provide a compact, portable unit operable in connection with a supply of water under pressure to apply selectively-variable concentrations of additives to soil areas as an incident of area irrigation.

A further object of the invention is to provide improved means for the operatively-adjustable support and supplementary feed of additives to a spray nozzle in served relation with a supply of water under pressure.

A further object of the invention is to provide an improved nozzle adapted to receive, intermix, and simultaneously spray-deliver water and selectively-proportioned amounts of additives in reaction to the pressure-feed of water thereto.

A further object of the invention is to provide an improved spray unit that is simple and inexpensive of manufacture, facile of use throughout a wide range of specific purposes and particular adjustments, positive and efficient in attainment of the ends for which designed, and readily adaptable to cooperation with conventional water supply facilities and agencies.

Figure 1:
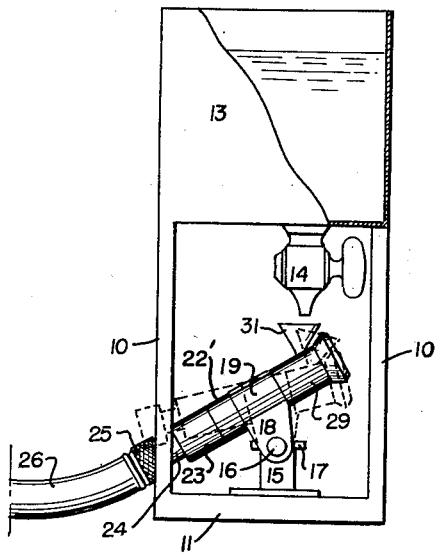
Figure 2:
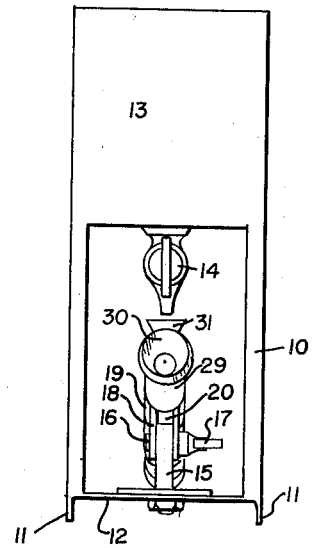
Figure 3:
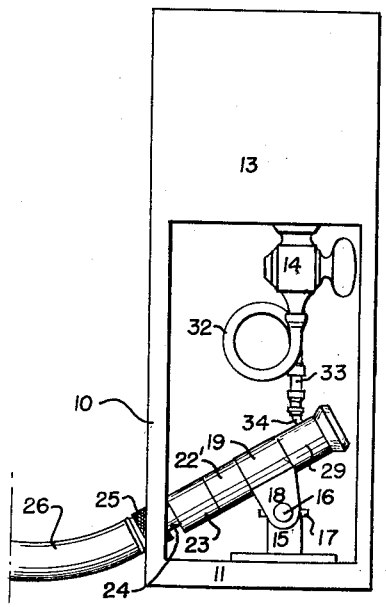
Figure 4:
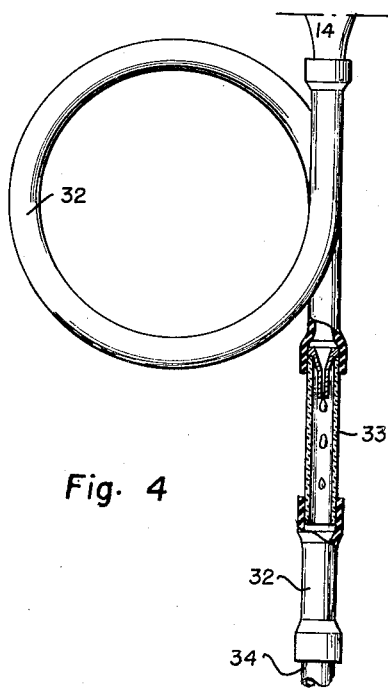
Figure 5:
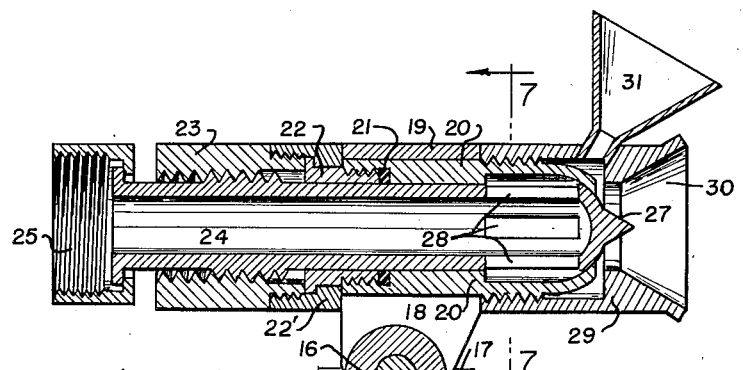
Figure 6:
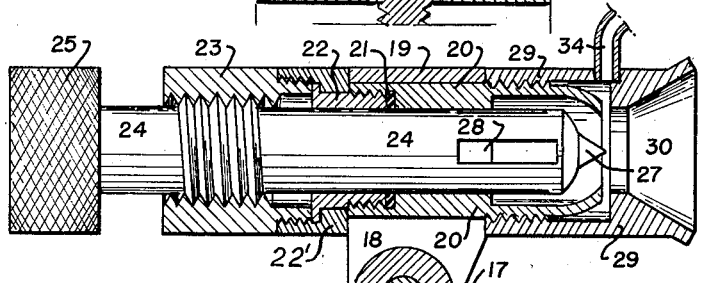
Figure 7:
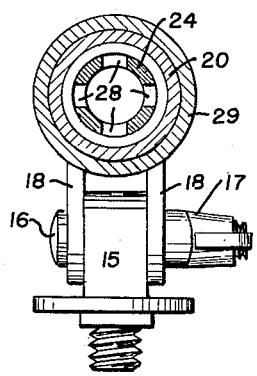
Figure 8:
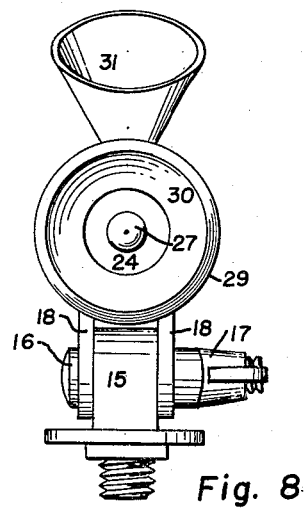

With the foregoing and other objects in view, my invention consists in the construction, arrangement, and combination of elements hereinafter set forth, pointed out in my claims, and illustrated by the accompanying drawings, in which:

Figure 1 is a side elevation of a typical embodiment of the invention as connected and arranged for practical use, certain structural elements being broken away to illustrate otherwise concealed relationships and broken lines indicating an alternative position of the adjustably-mounted spray nozzle. Figure 2 is a front or delivery end elevation of the arrangement according to Figure 1. Figure 3 is a view similar to Figure 1 illustrating a modified construction and arrangement of elements comprised in the invention. Figure 4 is a fragmentary, detail elevation, partly in section and on an enlarged scale, of a flow connection employed in the arrangement according to Figure 3. Figure 5 is a longitudinal section, on an enlarged scale, taken axially through the spray nozzle shown in Figures 1 and 2 with the adjustable elements of the assembly adjacent one limit of their operative range. Figure 6 is a section similar to Figure 5 through the nozzle shown in Figure 3, the inner, tubular element of the assembly being shown in full lines and retracted in its range of adjustment from the relationship shown in Figure 5. Figure 7 is a cross section taken substantially on the indicated line 7—7 of Figure 5. Figure 8 is a front or delivery end elevation of the showing of Figure 5.

In the construction of the improvement as shown, the numeral 10 designates a rigid, generally-rectangular, skeleton frame of any suitable specific construction and relative size. The frame 10 provides or fixedly engages with lower end members 11 slidably engageable with a ground surface to selectively position and support the frame in upstanding relation therewith, and transverse floor or brace elements 12 rigidly connect between upper margins of the members 11 in general parallelism with and spaced relation above the unit ground support. The upper end of the frame 10 is formed as or fixedly supports a tank or reservoir 13, of appropriate capacity and suitable particular construction, with its floor or bottom closure spaced well above the elements 12 to provide open areas in the frame walls between said tank and elements, and a suitable valve 14 is engaged with and depends below the tank 13 floor in controlling relation with a gravity outflow passage wherethrough tank-confined solutions may discharge at selectively-variable rates.

Securely engaged with and to upstand from the elements 12 in spaced relation with and beneath the floor of the tank 13, a post 15 provides a mounting for the spray nozzle of the device, said post being formed with a transverse hole for the accommodation of a bolt 16 equipped with a wing-nut 17 and being embraced by like, spaced, parallel arms 18 extending in a generally radial direction from the tubular barrel of a mounting clip 19, holes formed in said arms 18 registering with the hole in the post 15 to receive the bolt 16 as an axis about which the clip 19 may be angularly adjusted and to dispose said bolt as a clamp element effective to secure said clip to and in any position of its angular adjustment upon said post.

The spray nozzle of the improvement includes a generally tubular housing member 20 exteriorly worked from one of its ends to approximately its midlength to cylindrical form in a size snugly receivable within and clampably engageable at times by the clip 19 barrel, and the so-worked end of said member 20 is counter-bored and internally threaded to provide an annular recess adapted to accommodate a sealing gasket 21 bearing against its base. The end of the member 20 remote from the clip 19 seat is counter-bored to form a chamber enlargement of its normal bore extending axially to approximately the member midlength and the end of the chamber-defining member wall is spherically and inwardly contoured to define a restricted end outlet from said chamber coaxial with and slightly less in size than the member normal bore. The chamber-defining wall of the member 20 is worked with external threads for a distance outwardly of the member from the inner limit of the clip 19 seat and curves thence from an initial diameter equaling that of the thread root and in conformity with its inner surface contour to the member end defining the restricted chamber outlet; the externally-threaded member 20 portion and adjacent member domed end hence projecting axially from and extending outwardly beyond the mounting clip 19 when the latter is embracingly engaged with the seat end portion of the member. A bushing 22 having an axial bore the same as the member 20 normal bore is provided in a major diameter less than that of the clip 19 barrel and is formed with an externally-threaded end coactably receivable within the threaded end recess of the member 20 and therein pressure-engageable against the gasket 21 to extrude the inner margin of the latter inwardly of the assembly normal bore, the other end of said bushing being provided with a radially-projecting, annular flange spacedly paralleling the adjacent end of said member when the bushing is end-seated against said gasket. Telescoped over and rotatable about that portion of the bushing 22 projecting axially from the member 20, an annular collar 22' is formed in a major diameter approximating that of the clip 19 barrel and with a two-diameter bore whereof the lesser portion receives the unthreaded portion of the bushing 22 and the greater portion accommodates the bushing end flange, the shoulder at the junction of the collar bore portions slidably engaging said flange to inhibit separation of the collar 22' from the bushing 22 in one direction. The collar 22' is of a length to extend over and beyond the bushing 22 flange in a direction away from the member 20 and the bore of the so-projecting collar end is internally threaded. End-engageable with and mountable as a coaxial extension upon the collar 22', a straight, cylindrical sleeve 23 is formed with an internally-threaded axial bore in a minimum diameter corresponding with the normal bore of the member 20 and bushing 22 and an axially-projecting, externally-threaded stud on one of its ends coactably receivable within the threaded end recess of said collar to complete a separable, aligned assembly of the elements 20, 22, 22' and 23 longitudinally traversed by a straight, cylindrical bore of uniform minimum diameter save for the marginal intrusion of the gasket 21 and the restricted chamber outlet at the end of the member 20 remote from said gasket; the unit comprised from the elements 22' and 23 being rotatable without relative axial displacement on the bushing 22.

A tubular stem 24 having one open and one closed end is formed in a size slidably and rotatably receivable within the bore common to the assembled elements 20, 22 and 23 and to a length exceeding that of the assembled said elements. The open end of the stem 24 is flanged and furnished with a relatively-rotatable, internally-threaded, conventional hose coupling element 25 whereby said stem may be engaged with and as a flow-receiving terminal on a flow line, or hose, 26 in a customary manner, and the closed end of said stem is crowned for sealing coaction at times with the inner lip of the member 20 restricted chamber outlet and is furnished with a fixedly-related, conical diffusing point 27 projecting outwardly and axially of said stem from said end closure. Inwardly from and adjacent its open end, the stem 24 is provided with external threads outstanding from its exterior surface for coaction with the internal threads of the sleeve 23, whereby rotation of said sleeve and its associated collar 22' relative to the assembly of elements 20 and 22 acts to feed the stem closed end toward and away from the member 20 restricted chamber outlet, depending upon the direction of such relative rotation, while securely and operatively interconnecting said stem and assembly, and the walls of the stem 24 inwardly adjacent the stem closed end are slotted or otherwise suitably intersected, as at 28, to provide adequate flow communication between the stem interior and the chamber enlargement of the member 20, so that fluid pressure-fed through the line 26 to the stem interior may pass freely thence to said chamber enlargement for discharge through the space between the stem end crown and inner lip of the chamber outlet. As will be obvious, pressure expansion of the gasket 21 inner margin against the stem 24 exterior deriving from the threaded interengagement of the elements 20 and 22 is effective to seal the assembly against fluid leakage along said stem in a direction toward the threaded connection of said stem with the sleeve and to minimize the tendency of said stem to rotate with the sleeve 23.

In covering relation with the end of the member 20 housing the chamber enlargement, a generally tubular hood 29 is formed with internal threads at one end coactable with the member 20 external threads to mount said hood on and as a coaxial extension of the end of the element 20, 22, 22' and 23 assembly remote from the stem 24 open end with the hood inner end adjacent the clip 19 margin remote from the bushing 22 and hence positioned to inhibit displacement of the element 20, 22, 22' and 23 assembly in one direction axially of said clip. The hood 29 freely accommodates the chamber enlargement end of the member 20 in a spacing away from the crowned tip of the latter effective to provide an annular compartment about and in communication with the chamber outlet or discharge opening, and said hood extends axially of and outwardly beyond the member 20 in the form of a frusto-conical mouth 30 coaxial with and diverging outwardly through the hood free end from the stem 24, the lesser end of said mouth opening through a web transversely of the hood in registration and spaced opposition with the chamber outlet of the member 20, so that fluid escaping from said member chamber about the closed end of the stem 24 is directed to ultimate spray discharge by said mouth and the point 27, the enhanced outflow velocity consequent upon the shapes of the chamber outlet and mouth 30 functioning with Venturi effect to induce flow from the annular compartment about the member 20 end through the space between said member end and the mouth lesser end for admixture and discharge with the fluid stream supplied by the line 26.

It is the function of the annular compartment within the hood 29 to receive solution from the tank 13 as discharged thence through the valve 14 and to consequently feed such solution in regulated proportion to and for spray delivery with the irrigating stream supplied by the line 26, to which end a port in the upper arc of the hood 29 wall is positioned to provide access to said compartment and is operatively engaged by means effective to deliver the valve 14 discharge therethrough. As is shown in Figures 1, 2, 5, and 8, a widemouth funnel 31 is fixed to upstand from the hood 29 and deliver through the hood port to the annular compartment therewithin, so that, the elements of the apparatus being suitably assembled and interrelated, gravity discharge from the valve 14 will be received by the funnel 31 in all operative adjustments of the spray nozzle; an alternative arrangement for solution feed from the tank 13 to said annular compartment being illustrated in Figures 3, 4 and 6 as including a flexible tube 32 operatively connected with and depending from the outlet of the valve 14, a flow sight 33, of any suitable specific construction, interrupting said tube to permit visual check on the rate of solution flow therethrough, and a nipple 34 operatively connecting the lower end of said tube through the hood 29 port with the annular compartment interiorly of the hood.

Operation of the improvement for realization of its advantages in practical use should be readily apparent from the drawings and foregoing description. The tank 13 being charged with any suitable concentrated solution having plant-growth-stimulating, weed-inhibiting, or insect-destroying properties and the coupling element 25 being engaged with the discharge end of the line 26, the unit is positioned in desired relation with an area to be irrigated and the angular relation of the spray nozzle on its mounting post 15 adjusted to suitably direct the discharge from said nozzle. Pressure flow of fluid through the line 26 being established, the sleeve 23 and collar 22' unit is rotated on the bushing 22 to desired adjustment of the stem 24 closed end relative to the member 20 chamber outlet and consequent regulation of the spray discharge from the nozzle, and the valve 14 is opened to effect feed or solution from the tank 13 to the nozzle annular compartment at a desired rate selectively proportioned to the main fluid flow through the nozzle; the solution so fed to the nozzle being automatically admixed with and uniformly distributed by the flow from the line 26 as a consequence of the nozzle construction illustrated and described. The unit is conveniently portable in operative association with a flexible line 26 and may be moved about as deemed necessary for adequate irrigation and treatment of lawn, garden, and other areas, the tank 13 is adapted for facile recharging without interruption of unit operation, if and when necessary, and the selective adjustments provided permit full regulation and control of all factors incident to practical use of the organization.

Since changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A fertilizer spray device comprising a ground-supportable, portable frame, a post fixedly upstanding from lower elements of said frame, a spray nozzle hingedly carried by said post for adjustment in a vertical arc, means for operatively connecting one end of said nozzle with a fluid flow line, a solution-accommodating tank carried by said frame in spaced, elevated relation with said nozzle, a valve-controlled gravity outflow from said tank, and means for directing the discharge through said outflow to and into the main flow path through said nozzle, wherein said nozzle includes a Venturi-type flow passage and an annular compartment about and in communication with said passage and the tank outflow directing means is a funnel fixedly upstanding from and exteriorly of the nozzle beneath the tank outflow in flow communication with said compartment.

2. A fertilizer spray device comprising a ground-supportable, portable frame, a post fixedly upstanding from lower elements of said frame, a spray nozzle hingedly carried by said post for adjustment in a vertical arc, means for operatively connecting one end of said nozzle with a fluid flow line, a solution-accommodating tank carried by said frame in spaced, elevated relation with said nozzle, a valve-controlled gravity outflow from said tank, and means for directing the discharge through said outflow to and into the main flow path through said nozzle, wherein said nozzle includes a Venturi-type flow passage and an annular compartment about and in communication with said passage and the tank outflow directing means is a nipple tube-connected with the tank outflow fixedly upstanding from and exteriorly of the nozzle in flow communication with said compartment.

3. In a fertilizer spray device having an elevated solution-accommodating tank and a valve-controlled gravity outflow from said tank, a spray nozzle connectible with a fluid flow line adjustably associated with and beneath said tank in position to combine tank outflow and line feed in a simultaneous discharge, said nozzle comprising a tubular barrel formed with a Venturi-type flow passage adjacent its discharge end, an annular compartment about and in communication with said passage, a tubular feed stem threadedly associated with said barrel and projecting axially through the intake end thereof for connection with a flow line, a closed inner end on said stem in variable adjacency with said passage, flow passages intersecting said stem adjacent its closed end, and means for conducting outflow from said tank to said compartment.

JOHN G. PETERLIN.

REFERENCES CITED

The following references are of record in the file of this patent:

UNITED STATES PATENTS

| Number | Name | Date |
|---|---|---|
| 1,179,905 | Engelman | Apr. 18, 1916 |
| 1,339,885 | Havey | May 11, 1920 |
| 1,866,620 | Chesnut | July 12, 1932 |
| 1,873,992 | Boag | Aug. 30, 1932 |
| 2,039,275 | McGrael | Apr. 28, 1936 |
| 2,050,522 | Evans et al. | Aug. 11, 1936 |
| 2,264,539 | Linstaedt | Dec. 2, 1941 |
| 2,343,647 | Doerr | Mar. 7, 1944 |